(12) United States Patent
Hsia et al.

(10) Patent No.: US 10,317,611 B2
(45) Date of Patent: Jun. 11, 2019

(54) DISPLAY DEVICE

(71) Applicant: InnoLux Corporation, Jhu-Nan, Miao-Li County (TW)

(72) Inventors: Kuang-Te Hsia, Miao-Li County (TW); Chuang-Hsun Chiu, Miao-Li County (TW); Yu-Cheng Cheng, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 16 days.

(21) Appl. No.: 15/680,536

(22) Filed: Aug. 18, 2017

(65) Prior Publication Data

US 2018/0059311 A1 Mar. 1, 2018

(30) Foreign Application Priority Data

Aug. 24, 2016 (CN) .......................... 2016 1 0714867

(51) Int. Cl.
*F21V 8/00* (2006.01)
*G02F 1/1333* (2006.01)
*G02F 1/1368* (2006.01)
*G02F 1/1335* (2006.01)

(52) U.S. Cl.
CPC ......... *G02B 6/0055* (2013.01); *G02B 6/0056* (2013.01); *G02B 6/0083* (2013.01); *G02B 6/0088* (2013.01); *G02F 1/133308* (2013.01); *G02F 1/1368* (2013.01); *G02F 1/133514* (2013.01); *G02F 1/133528* (2013.01); *G02F 2001/133531* (2013.01)

(58) Field of Classification Search
CPC .................................................... G02B 6/0055
See application file for complete search history.

(56) References Cited

U.S. PATENT DOCUMENTS

2015/0271909 A1* 9/2015 Brooks .................... G01R 1/02
                                                    324/127
2016/0334560 A1* 11/2016 You ....................... G02B 6/009

* cited by examiner

*Primary Examiner* — Sharon E Payne
(74) *Attorney, Agent, or Firm* — Muncy, Geissler, Olds & Lowe, P.C.

(57) ABSTRACT

A display device includes a display panel and a backlight module. The display panel is disposed opposite to the backlight module. The backlight module includes a metal substrate, a light emitting element, a circuit layer, an adhesive layer, a reflective element and a light guiding element. The light emitting element is disposed at one side of the circuit layer facing the light guiding element. The adhesive layer is disposed between the circuit layer and a surface of the metal substrate. The reflective element is disposed adjacent to the circuit layer and the adhesive layer and is located on the surface of the metal substrate. The reflective element is disposed between the metal substrate and the light guiding element. A bottom surface of the adhesive layer and at least a part of a bottom surface of the reflective element are located at a same plane.

12 Claims, 5 Drawing Sheets

DISPLAY DEVICE

CROSS REFERENCE TO RELATED APPLICATIONS

This Non-provisional application claims priority under 35 U.S.C. § 119(a) on Patent Application No(s). 201610714867.2 filed in People's Republic of China on Aug. 24, 2016, the entire contents of which are hereby incorporated by reference.

BACKGROUND

Technical Field

The present disclosure relates to a display device and, in particular, to a flat display device.

Related Art

In the recent years, the processes and materials for manufacturing light emitting diodes (LED) have been improved, so that the lighting efficiency of LED is sufficiently enhanced. Different from the general fluorescent lamp or compact lamp, the LED lamp has the features of low power consumption, long lifetime, high safety, short response time, and small size. Accordingly, the LED lamps have been applied to the lighting apparatuses such as the indoor lamps, flashlights, headlights of vehicles, other lighting devices, or the backlight module of flat display device.

For example, the edge-type backlight module of the flat display device generally includes a metal back plate, a reflective plate, a flexible lighting bar, and a light guiding plate. The metal back plate supports the reflective plate, the flexible lighting bar and the light guiding plate. The flexible lighting bar faces the light guiding plate and is disposed on the metal back plate for emitting light toward the light guiding plate. The light guiding plate is configured to guide the transmission of the emitted light. Due to the total reflection of the light guiding plate, the light can be guided and outputted through the light output surface of the light guiding plate, thereby providing a uniform surface light to the display panel. In addition, the reflective plate can reflect the light outputted from the bottom surface of the light guiding plate back to the light guiding plate so as to increase the utility of the light.

In the assembling procedure of the backlight module, the flexible lighting bar is usually attached to the metal back plate with an adhesive tape in manual, and then the residual components are assembled. However, the above manual procedure has the following drawbacks. First, the above manual procedure needs a lot of time and has larger assembling tolerances. Besides, the tightness between the metal back plate and the flexible lighting bar can sufficiently affect the heat dissipation efficiency of the LED, so that the LED may have poor heat dissipation so as to cause the increase of operation temperature if bubbles exist in the attaching part. Second, the flexible lighting bar can be easily bended during the assembling and the LED may be easily contacted by hands, thereby decreasing the product reliability and strength. Third, the flexible lighting bar must be removed from the metal back plate during the rework procedure, which can also easily cause the deformation of the flexible lighting bar and the loosening of the LED. Fourth, the automatic machine cannot easily pick up or suck the flexible lighting bar, so that it is hard to carry out the automatic assembling process.

SUMMARY

An objective of the disclosure is to provide a display device with reduced components. The display device of the disclosure has good assembling accuracy, reworkability and reliability and can be utilized in the automatic assembling process.

A display device includes a display panel and a backlight module. The display panel is disposed opposite to the backlight module. The backlight module includes a metal substrate, a light emitting element, a circuit layer, an adhesive layer, a reflective element and a light guiding element. The light emitting element is disposed on the circuit layer and facing a side surface of the light guiding element. The adhesive layer is disposed between the circuit layer and a surface of the metal substrate. The reflective element is disposed adjacent to the circuit layer and the adhesive layer and is located on the surface of the metal substrate. The reflective element is disposed between the metal substrate and the light guiding element. A bottom surface of the adhesive layer and at least a part of a bottom surface of the reflective element are substantially located at a same plane.

BRIEF DESCRIPTION OF THE DRAWINGS

The embodiments will become more fully understood from the detailed description and accompanying drawings, which are given for illustration only, and thus are not limitative of the present disclosure, and wherein.

DETAILED DESCRIPTION OF THE DISCLOSURE

The embodiments of the disclosure will be apparent from the following detailed description, which proceeds with reference to the accompanying drawings, wherein the same references relate to the same elements. Moreover, the drawings of all implementation are schematic, and they do not mean the actual size and proportion. The terms of direction recited in the disclosure, for example up, down, left, right, front, or rear, only define the directions according to the accompanying drawings for the convenience of explanation but not for limitation. The names of elements and the wording recited in the disclosure all have ordinary meanings in the art unless otherwise stated. Therefore, a person skilled in the art can unambiguously understand their meanings.

Figure 1:
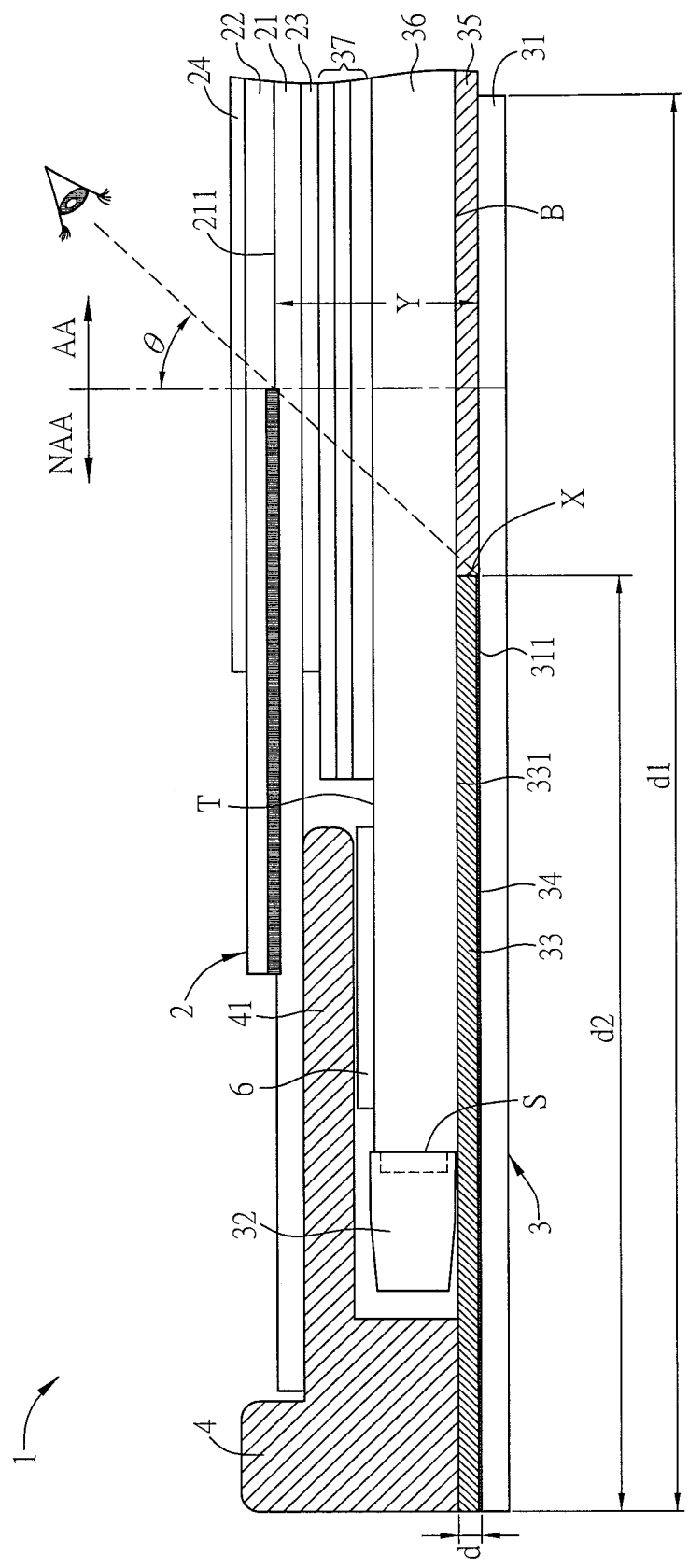
FIG. 1 is a schematic diagram showing a display device according an embodiment of the disclosure.
Figure 2:
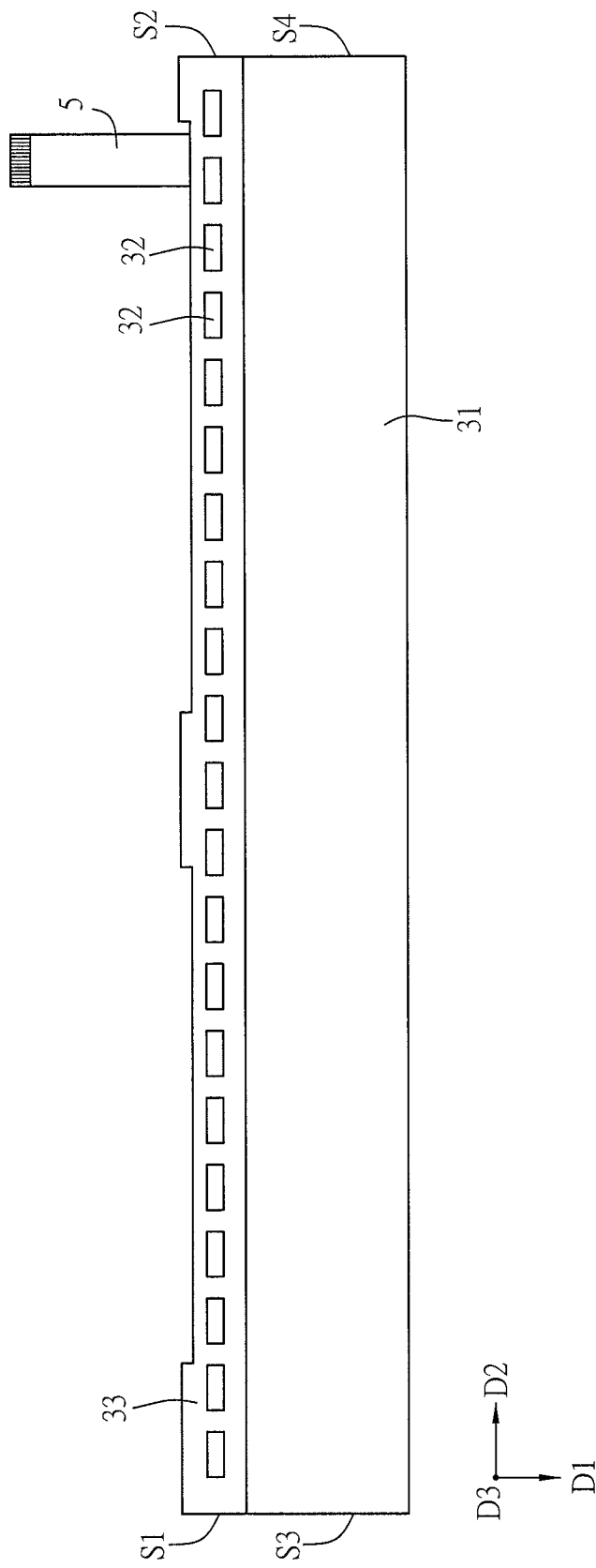
FIG. 2 is a top view of the metal substrate, the light emitting element and the circuit layer of the backlight module of the display device as shown in FIG. 1.

FIG. 1 is a schematic diagram showing a display device 1 according an embodiment of the disclosure, and FIG. 2 is a top view of a metal substrate 31, a light emitting element 32, and a circuit layer 33 of a backlight module 3 of the display device 1 as shown in FIG. 1.

As shown in FIG. 1, the display device 1 includes a display panel 2 and a backlight module 3. The backlight module 3 is disposed opposite to the display panel 2 and is configured to emit light, which passes through the display panel 2 for displaying images. In this embodiment, the display panel 2 can be an FFS (Fringe Field Switching) liquid crystal display panel, an IPS (In Plane Switching) type or TN (Twisted Nematic) type liquid crystal display panel, a VA (Vertical Alignment) type liquid crystal display panel, or other types of liquid crystal display panels. This disclosure is not limited. To make the description of the disclosure more comprehensive, the figures show a first direction D1, a second direction D2 and a third direction D3, which are substantially perpendicular to one another. For example, the first direction D1 is substantially parallel to the extending direction of the scan lines of the display panel 2, the second direction D2 is substantially parallel to the extending direction of the data lines of the display panel 2, and the third direction D3 is substantially perpendicular to the first direction D1 and the second direction D2. Alternatively, the first direction D1 can be substantially parallel to the extending direction of the data lines of the display panel 2, and the second direction D2 is substantially parallel to the extending direction of the scan lines of the display panel 2. This disclosure is not limited.

The display panel 2 includes a first substrate 21, a second substrate 22, a liquid crystal layer (not shown), and two polarizers 23 and 24. The first substrate 21 is disposed opposite to the second substrate 22, and the liquid crystal layer is disposed between the first substrate 21 and the second substrate 22. In this embodiment, the first substrate 21 is a TFT (thin-film-transistor) substrate, and the second substrate 22 is a CF (color filter) substrate. In other embodiments, the black matrix of the CF substrate and the filter layer can be formed on the TFT substrate, and the first substrate 21 becomes a BOA (BM on array) substrate or a COA (color filter on array) substrate, and this disclosure is not limited.

The polarizer 23 is a lower polarizer, and the polarizer 24 is an upper polarizer. The polarizer 23 (lower polarizer) is disposed on one side of the first surface 21 away from the second substrate 22, and the polarizer 24 (upper polarizer) is disposed at one side of the second substrate 22 away from the first substrate 21. The first polarizer 23 is disposed on the lower surface of the first substrate 21, and the second polarizer 24 is disposed on the upper surface of the second substrate 22. The polarizing axes of the two polarizers 23 and 24 substantially have a phase difference of 90 degrees, so that the light characteristics can be modulated by controlling the intensity of the electric field to bias the liquid crystals, thereby enabling the display panel 2 to display images.

The backlight module 3 includes a metal substrate 31, a light emitting element 32, a circuit layer 33, an adhesive layer 34, a reflective element 35, and a light guiding element 36. In addition, the backlight module 3 further includes at least one optical plate 37.

The metal substrate 31 is, for example, an aluminum substrate or a copper substrate. In some embodiments, the thickness of the metal substrate 31 (along the third direction D3) is greater than or equal to 0.15 mm and less than or equal to 0.3 mm.

The light emitting element 32 is disposed on the circuit layer 33 and facing the light guiding element 36. The light guiding element 36 has a side surface S, a bottom surface B and a top surface T, and the bottom surface B and the top surface T are disposed opposite to each other and are connected to the side surface S. The light emitted from the light emitting element 32 enters the light guiding element 36 through the side surface S (the light input surface) of the light guiding element 36, and exits the light guiding element 36 through the top surface T (the light output surface). Accordingly, the backlight module 3 is an edge-type backlight module. The light guiding element 36 is configured for guiding the transmission direction of the light. In more detailed, the light guiding element 36 can provide a total reflection, and the light entering the light guiding element 36 can be guided to the top surface T and exit the light guiding element 36 through the top surface T. In this embodiment, the light guiding element 36 is made of transparent materials, such as acrylic resin, polycarbonate, polyethylene resin, or glass, and this disclosure is not limited. In addition, the light guiding element 36 may have a plate shape or a wedge shape. In this embodiment, the light guiding element 36 has a plate shape.

As shown in FIG. 2, the backlight module 3 of the embodiment has a plurality of light emitting elements 32, which are separately disposed on the circuit layer 33 along the second direction D2 and electrically connected to the circuit layer 33, respectively. In this case, the backlight module 3 has a driving circuit (not shown) through the circuit layer 33 for driving the light emitting elements to emit light. In this embodiment, the light emitting element 32 are LEDs, which are disposed on the circuit layer 33 by SMT (Surface Mount Technology).

The circuit layer 33 is disposed above the metal substrate 31. In more detailed, the circuit layer 33 has at least one side surface, and the metal substrate 31 has a side surface corresponding to the side surface of the circuit layer 33. The side surface of the circuit layer 33 is even with (at the same plane of) the side surface of the metal substrate 31. In this embodiment, the circuit layer 33 is disposed above the metal substrate 31 and has a first side surface S1 and a second side surface S2, which are disposed opposite to each other, and the metal substrate 31 has a third side surface S3 and a fourth side surface S4 disposed corresponding to the first side surface S1 and the second side surface S2, respectively. The first side surface S1 is overlapped and even with the third side surface S3, and the second side surface S2 is overlapped and even with the fourth side surface S4. In the conventional art, the sides of the flexible lighting bars are usually not even when attaching the flexible lighting bars on the metal back plate by tapes. In this embodiment, at least one sides of the circuit layer 33 and the metal substrate 31 are even. In some embodiments, at least two opposite sides of the circuit layer 33 and the metal substrate 31 are even. This configuration can increase the area for conducting heat.

Referring to FIG. 1, the metal substrate 31, the adhesive layer 34, and the circuit layer 33 form a metal core printed circuit board (MCPCB). In this embodiment, a width of the metal substrate 31 along the first direction D1 is greater than a width of the circuit layer 33 along the first direction D1. In other words, the metal substrate 31 extends from the inside of the circuit layer 33 along the first direction D1 and protrudes from the edge of the circuit layer 33. Moreover, the metal substrate 31 has a surface 311, and the adhesive layer 34 is disposed between the circuit layer 33 and the surface 311 of the metal substrate 31. In this embodiment, the circuit layer 33 is attached to the surface 311 of the metal substrate 31 by the adhesive layer 34. The adhesive layer 34 can be a thermosetting gel or a thermal conductive gel, so that the heat generated by the light emitting elements 32 (as well as the circuit layer 33) can be transferred to the metal substrate 31 through the adhesive layer 34 and then dissipated via the metal substrate 31.

If the metal substrate 31 is longer along the first direction D1, the entire area thereof is larger and the heat dissipation effect is better. In some embodiments, the metal substrate 31 has a first width d1 along the first direction D1, and the circuit layer 33 has a second width d2 along the first direction D1. A difference between the first width d1 and the second width d2 is greater than or equal to 0.5 mm and less than or equal to 5000 mm (0.5 mm≤d1−d2≤5000 mm). In other words, a part of the metal substrate 31 protruding from the circuit layer 33 along the first direction D1 is greater than or equal to 0.5 mm. In some embodiments, the metal substrate 31 may have a first width along the second direction D2, and the circuit layer 33 has a second width along the second direction D2. A difference between the first width and the second width is also greater than or equal to 0.5 mm, and this disclosure is not limited. In practice, the size of the protruding part of the metal substrate 31 along the first direction D1 or the second direction D2 can be adjusted based on the actual requirements, thereby modifying the weight of the backlight module 3, the mechanical strength and the heat dissipation efficiency to achieve the desired requirements.

To be noted, in the conventional backlight module, the flexible lighting bar, which is made by configuring a plurality of light emitting elements on a flexible substrate, is attached to the metal back plate. The metal back plate is an additional component and configured for supporting the components of the backlight module and dissipating heat. In this embodiment, the metal substrate 31 of the metal core printed circuit board for configuring the light emitting elements 32 can substitute the functions of the conventional metal back plate. Accordingly, the conventional metal back plate is not needed in the disclosure, so that the total components of the display device of the disclosure can be reduced.

In addition, the display panel 2 includes a display surface, which has an active area AA and a non-active area NAA disposed adjacent to the active area AA. The active area AA is a part of the display surface that the light can pass through, and the non-active area AA is a part of the display surface that the light cannot pass through and is covered by the shielding layer. In practice, the length of the circuit layer 33 along the first direction D1 can be modified corresponding to various viewing angles so as to prevent the circuit layer 33 from being viewed via the active area AA. The length of the circuit layer 33 along the first direction D1 is not over the defined viewing angle. This configuration can avoid the viewable gap between the circuit layer 33 and the metal substrate 31 as well as the non-uniform color of the pixels of the display panel 2.

As shown in FIG. 1, in some embodiments, the viewable angle θ is ranged from 0 to 60 degrees. In the general design, the viewable angle θ of the commercial tablet computer is 45 degrees. The top surface 211 of the first substrate 21 and the surface 311 of the metal substrate 31 has a distance Y, which is greater than or equal to 0.5 mm and less than or equal to 3 mm. Along the third direction D3, the edge X of the circuit layer 33 must be between the active area AA and the light emitting element 32 to prevent the viewing interference of the display device 1.

The reflective element 35 is disposed adjacent to the circuit layer 33 and the adhesive layer 34, and is disposed on the surface 311 of the metal substrate 31. Besides, the reflective element 35 is disposed between the metal substrate 31 and the bottom surface B of the light guiding element 36. The reflective element 35 can reflect the light outputted from the bottom surface B of the light guiding element 36 back to the light guiding element 36 so as to increase the utility of the light. The reflective element 35 can be a reflective layer (e.g. a metal coating layer) or a reflective plate. In this embodiment, the reflective element 35 is a reflective plate. The reflective element 35 includes a reflective material such as metal, metal oxide, high reflective paint (white paint), or their combinations, and this disclosure is not limited.

In addition, a bottom surface of the adhesive layer 34 and at least a part of a bottom surface of the reflective element 35 are located at the same plane. In this embodiment, the bottom surface of the adhesive layer 34 and the bottom surface of the reflective element 35 are directly contacted with the surface 311 of the metal substrate 31, so that the adhesive layer 34 and the reflective element 35 can be located at the same plane (the surface 311 of the metal substrate 31). In other embodiments, a part of the bottom surface of the reflective element 35 can be attached to the surface 311 of the metal substrate 31 by an adhesive, so that the bottom surface of the adhesive layer 34 and a part of the bottom surface of the reflective element 35 can be substantially located at the same plane. This disclosure is not limited. To be noted, it is unnecessary to attach the entire bottom surface of the reflective element 35 on the surface 311 of the metal substrate 31 by an adhesive, and attaching only a part of the bottom surface of the reflective element 35 to the surface 311 of the metal substrate 31 by an adhesive is enough.

Besides, the circuit layer 33 has a top surface 331. In this case, the top surface 331 of the circuit layer 33 is in contact with the bottom surface B of the light guiding element 36. The top surface 331 and the surface 311 of the metal substrate 31 has a gap d, which is greater than 0 and less than or equal to 0.25 mm (0<d≤0.25 mm). In practice, the gap d can be configured for the positioning and supporting of the reflective element 35, and value of the gap d can be adjusted by the thickness of the circuit layer 33. According to this design, it is possible to prevent the top surface T of the light guiding element 36 from being higher than or lower than the lower lighting surface of the light emitting element 32, which may lower the light utility, when the reflective element 35 has different thicknesses. Regarding the current tablet computer, the thickness of the reflective plate is generally greater than or equal to 0.082 mm and less than or equal to 0.188 mm, and the thickness of the circuit layer 33 is generally greater than or equal to 0.11 mm and less than or equal to 0.15 mm. In addition, the reflective element 35 and the circuit layer 33 with proper thicknesses can be selected based on the gap d, thereby decreasing the thickness of the backlight module 3.

The optical plate 37 is disposed on the top surface T of the light guiding element 36. In this embodiment, the backlight module 3 includes three stacked optical pates 37 disposed on the top surface T of the light guiding element 36. The optical plate 37 is, for example but not limited to, a diffuser, a 90° collector, a 0° collector, a brightness enhancement film, or other optical films. The optical plate 37 can transform the light outputted from the top surface T into a uniform surface light source.

Figure 3:
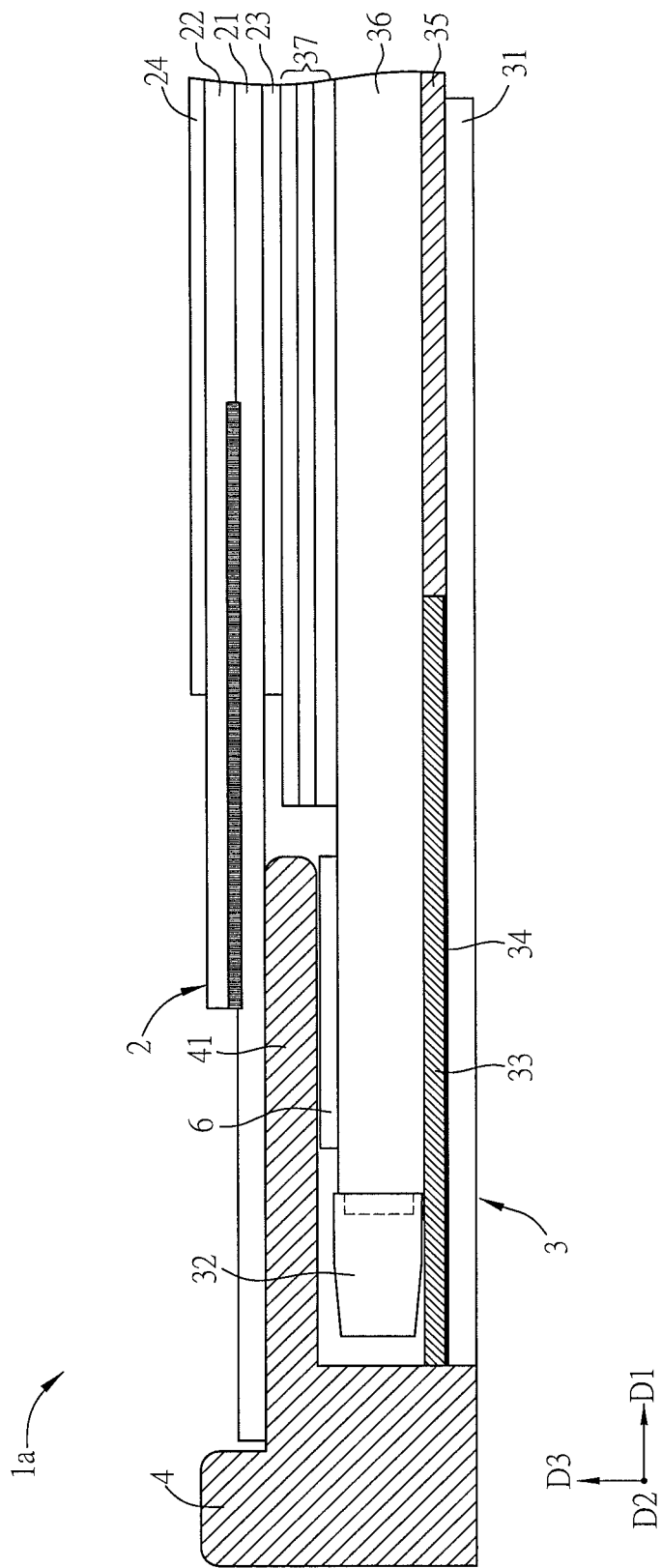
FIG. 3 is a schematic diagram showing another aspect of the display device according the embodiment of the disclosure.

The display device 1 of this embodiment further includes a frame 4 and a spacer 6. The frame 4 is disposed adjacent to the backlight module 3. In this case, the frame 4 has a supporting portion 41 for supporting the display panel 2, and the light emitting element 32 is disposed between the supporting portion 41 and the circuit layer 33. The spacer 6 includes a buffer material and is disposed between the supporting portion 41 of the frame 4 and the light guiding element 36 for providing a buffer function. In this embodiment, the frame 4 is disposed on the circuit layer 33, the adhesive layer 34, and the metal substrate 31, and this disclosure is not limited thereto. In another embodiment, such as the display device 1a of FIG. 3, the frame 4 is not located on the circuit layer 33 but disposed adjacent to the circuit layer 33, the adhesive layer 34, and the metal substrate 31.

The assembling procedure of the display device 1 will be described hereinafter. At first, a plurality of light emitting elements 32 are separately disposed on the circuit layer 33. Next, the circuit layer 33 is attached to the surface 311 of the metal substrate 31 by the adhesive layer 34, and the metal substrate 31 is protruded from the circuit layer 33 along the first direction D1. Then, the reflective element 35 is disposed adjacent to the circuit layer 33 and the adhesive layer 34 and is located on the surface 311 of the metal substrate 31, so that the bottom surface of the adhesive layer 34 and at least a part of the bottom surface of the reflective element 35 are substantially located at the same plane. Afterwards, the light guiding element 36 is disposed on the reflective element 35 and the circuit layer 33. Accordingly, the side surface S of the light guiding element 36 is facing the light emitting element 32, and the reflective element 35 is disposed between the metal substrate 31 and the light guiding element 36. Next, the optical plate 37 is disposed on the top surface T of the light guiding element 36 to obtain the backlight module 3. Finally, the frame 4 is disposed adjacent to the backlight module 3, and the supporting portion 41 of the frame 4 supports the display panel 2 to obtain the display device 1. Herein, the light emitting elements 32 are located between the supporting portion 41 and the circuit layer 33.

In the conventional backlight module, the metal back plate is configured to support the components of the entire backlight module, and the flexible lighting bar, which is made by disposing a plurality of LEDs on a flexible substrate, is attached to the metal back plate by tape. Regarding the display device 1 of the embodiment, the metal substrate 31 of the metal core printed circuit board for configuring the light emitting elements 32 can substitute the functions of the conventional metal back plate. Accordingly, the conventional metal back plate is not needed in the disclosure for supporting the backlight module, so that the total components of the display device of the disclosure can be reduced. In the backlight module 3 of the embodiment, the circuit layer 33 configured with the light emitting elements 32 is disposed on the surface 311 of the metal substrate 31 by the adhesive layer 34 to form the metal core printed circuit board, and the bottom surface of the adhesive layer 34 and at least a part of the bottom surface of the reflective element 35 are located at the same plane. Compared with the conventional structure with the metal back plate, the present disclosure uses the metal core printed circuit board in the assembling procedure. The display device of the disclosure has good assembling accuracy, reworkability and reliability and can be utilized in the automatic assembling process.

Figure 4A:
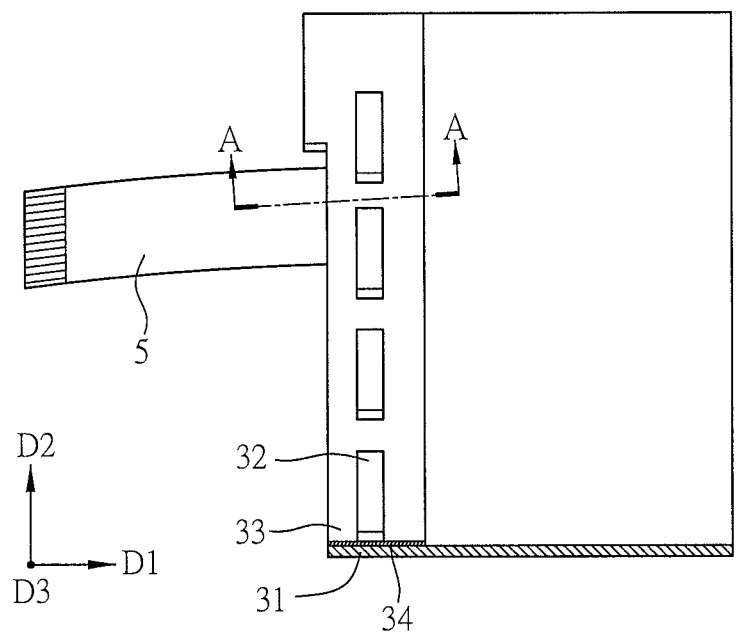
FIGS. 4A and 4B are sectional views of FIG. 2.
Figure 4B:
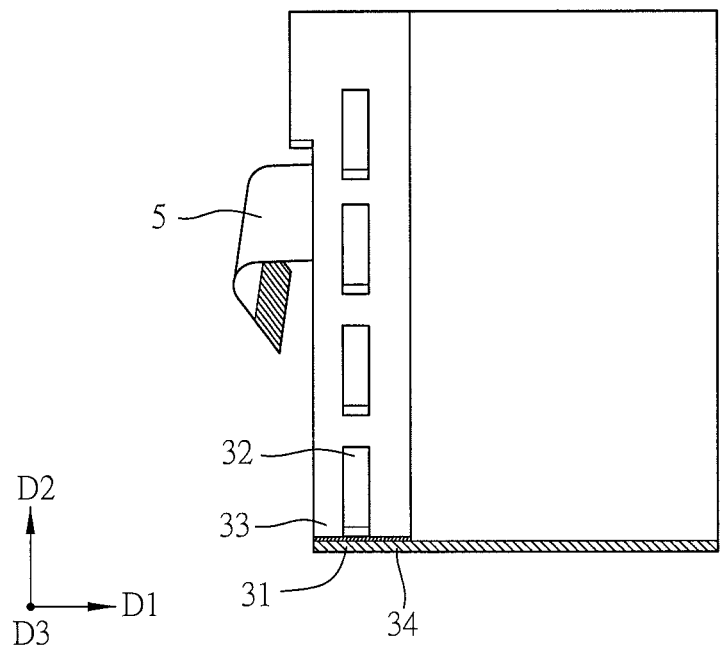
Figure 5:
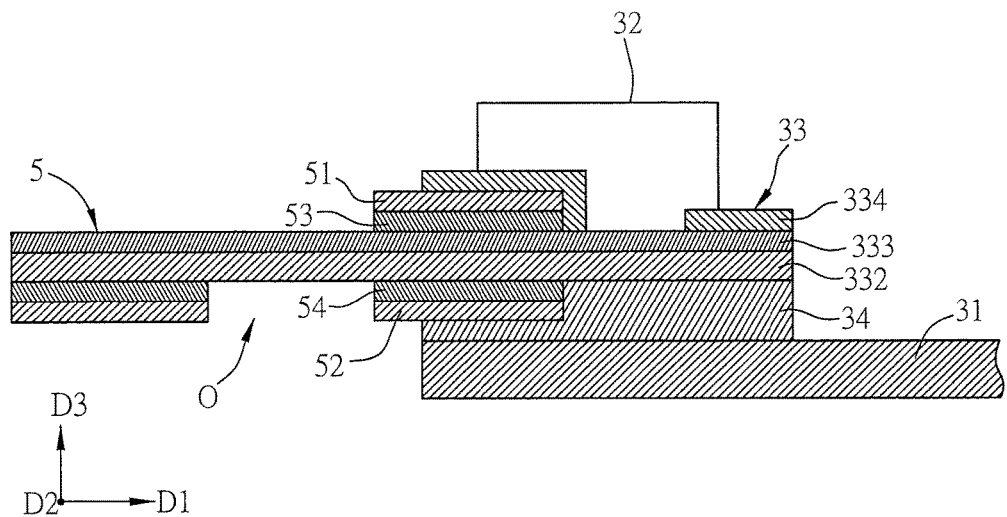
FIG. 5 is a sectional view of an aspect of FIG. 4A along the line A-A.

FIGS. 4A and 4B are sectional views of FIG. 2, and FIG. 5 is a sectional view of an aspect of FIG. 4A along the line A-A.

Referring to FIGS. 4A to 5, the backlight module 3 of the display device 1 further includes a flexible printed circuit board 5, which is connected to the circuit layer 33. The flexible printed circuit board 5 is flexible (as shown in FIG. 4B) and is extended from the circuit layer 33. One end of the flexible printed circuit board 5 is configured with golden fingers for electrically connected to a driving circuit board (not shown). Thus, the driving circuit of the driving circuit board can drive the light emitting elements 32 to emit light through the flexible printed circuit board 5 and the circuit layer 33.

As shown in FIG. 5, the circuit layer 33 at least includes a conductive core layer 332 and a metal layer 333 (e.g. a copper layer), and the conductive core layer 332 and the metal layer 333 are extended to the flexible printed circuit board 5, respectively. In this embodiment, the flexible printed circuit board 5 includes a flexible layer 52, a bonding layer 54, a bonding layer 53 and a flexible layer 51 in order. The flexible layers 51 and 52 can be made of a material with good flexibility, such as polyimide (PI), and the conductive core layer 332 and the metal layer 333 are disposed between the flexible layers 51 and 52. In this case, the flexible layers 51 and 52 are bonded to the circuit layer 33 by the bonding layers 53 and 54, respectively. In addition, the flexible layer 52 and the bonding layer 54 close to the metal substrate 31 are configured with a recess O. The configuration of the recess O allows to easily bend the flexible printed circuit board 5 without breaking it, thereby enhancing the entire flexibility. Besides, the circuit layer 33 can be coated with a solder mask 334, such as a white paint, for preventing exposure of the circuit layer 33 through the active area.

Figure 6:
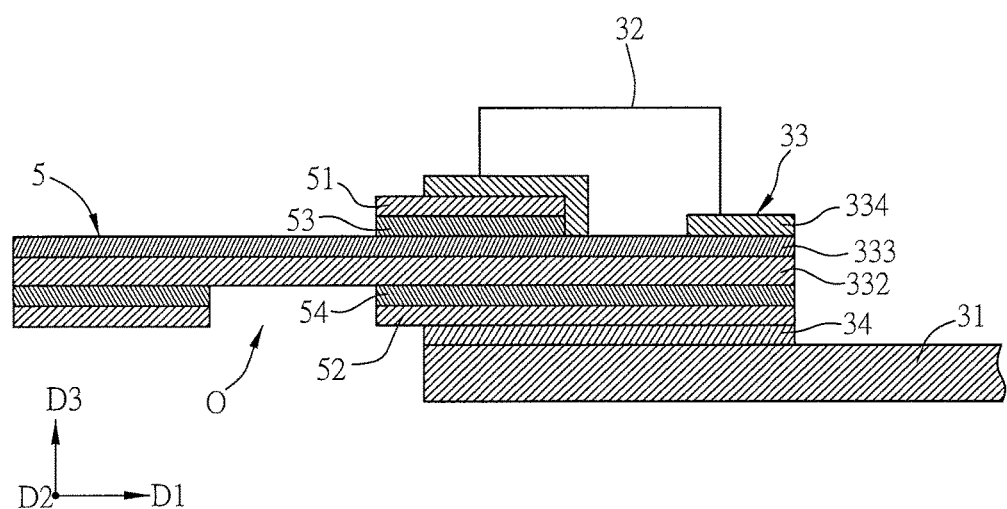
FIG. 6 is a sectional view of another aspect of FIG. 4A along the line A-A.

In another aspect as shown in FIG. 6, the flexible layer 52 and the bonding layer 54 located under the conductive core layer 332 may extend to the edge of the conductive core layer 332 along the first direction D1, so that the flexible layer 52 and the bonding layer 54 located close to the metal substrate 31 can be disposed between the circuit layer 33 and the adhesive layer 34.

In summary, the metal back plate of the conventional backlight module is configured to support the components of the entire backlight module, and the flexible lighting bar is attached to the metal back plate by tape. Regarding the display device of the embodiment, the metal substrate for configuring the light emitting elements and the circuit layer can substitute the functions of the conventional metal back plate. Accordingly, the conventional metal back plate is not needed in the disclosure for supporting the backlight module, so that the total components of the display device of the disclosure can be reduced. In addition, in the backlight module of the disclosure, the circuit layer configured with the light emitting elements is disposed on the surface of the metal substrate by the adhesive layer to form a metal core printed circuit board, and the bottom surface of the adhesive layer and at least a part of the bottom surface of the reflective element are located at the same plane. Compared with the conventional structure with the metal back plate, the present disclosure uses the metal core printed circuit board in the assembling procedure. Accordingly, the display device of the disclosure has good assembling accuracy, reworkability and reliability and can be utilized in the automatic assembling process.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A display device, comprising:
   a display panel;
   a backlight module disposed opposite to the display panel, wherein the backlight module comprises a metal substrate, a light emitting element, a circuit layer, an adhesive layer, a reflective element and a light guiding element, the light emitting element is disposed on the circuit layer, the light emitting element faces to a side surface of the light guiding element, the adhesive layer is disposed between the circuit layer and the metal substrate, the reflective element is disposed adjacent to the circuit layer and the adhesive layer, and the reflective element is disposed between the metal substrate and the light guiding element; and a flexible printed circuit board coupled with the circuit layer, wherein the flexible printed circuit board has two flexible layers, the circuit layer is disposed between the flexible layers, and the flexible layers are bonded to the circuit layer by bonding layers, wherein, a bottom surface of the adhesive layer and at least a part of a bottom surface of the reflective element are located at a same plane, the circuit layer has a first side surface adjacent to the side surface of the light guiding element, the metal substrate has a second side surface corresponding to the first side surface of the circuit layer, and the first side surface of the circuit layer is even with the second side surface of the metal substrate.

2. The display device of claim 1, wherein the metal substrate has a first width in a first direction perpendicular to the side surface of the light guiding element, the circuit layer has a second width in the first direction, the first width is greater than the second width, and a difference between the first width and the second width is greater than or equal to 0.5 mm and less than or equal to 5000 mm.

3. The display device of claim 1, wherein the circuit layer is disposed on the metal substrate, the circuit layer further has a third side surface opposite to the first side surface, the metal substrate further has a fourth side surface opposite to the second side surface and corresponding to the third side surface, and the third side surface is even with the fourth side surface.

4. The display device of claim 1, wherein the bottom surface of the adhesive layer and the bottom surface of the reflective element are directly in contact with the metal substrate.

5. The display device of claim 1, wherein the circuit layer has a first top surface, the metal substrate has a second top surface, a distance between the first top surface and the second top surface is greater than 0 mm and less than or equal to 0.25 mm.

6. The display device of claim 5, wherein the first top surface of the circuit layer is in contact with a bottom surface of the light guiding element.

7. The display device of claim 1, wherein the display panel comprises an active area, and an edge of the circuit layer is between the active area and an edge of the light emitting element in a plane view.

8. The display device of claim 1, further comprising:
a frame disposed adjacent to the backlight module, wherein the frame has a supporting portion for supporting the display panel, and the light emitting element is disposed between the supporting portion and the circuit layer.

9. The display device of claim 8, further comprising:
a spacer disposed between the supporting portion and the light guiding element.

10. The display device of claim 1, wherein the circuit board comprises a conductive core layer extending to the flexible printed circuit board.

11. The display device of claim 1, wherein one of the flexible layer adjacent to the metal substrate has a recess.

12. The display device of claim 1, wherein one of the flexible layer adjacent to the metal substrate is disposed between the circuit layer and the adhesive layer.

* * * * *